United States Patent [19]

Daughenbaugh et al.

[11] Patent Number: 5,055,957
[45] Date of Patent: Oct. 8, 1991

[54] METHOD OF MAKING LOW WEAR GLASS FOR MAGNETIC HEADS

[75] Inventors: Gerald A. Daughenbaugh; Eugene B. Rigby, both of Tucson, Ariz.

[73] Assignee: International Business Machines Corporation, Armonk, N.Y.

[21] Appl. No.: 608,584

[22] Filed: Nov. 2, 1990

Related U.S. Application Data

[63] Continuation of Ser. No. 367,733, Jun. 19, 1989, abandoned.

[51] Int. Cl.$^5$ .............................................. G11B 5/265
[52] U.S. Cl. .................................. 360/121; 360/120; 360/127; 65/41; 65/36
[58] Field of Search .................... 65/32.2, 36, 41, 59.1, 65/59.5; 29/603; 360/120, 121, 122, 127; 501/16, 61, 75

[56] References Cited

U.S. PATENT DOCUMENTS

| | | | |
|---|---|---|---|
| 3,494,026 | 2/1970 | Sugaya | 29/603 |
| 3,906,147 | 9/1975 | Pirooz | 501/61 |
| 4,069,360 | 1/1978 | Yanagisawa et al. | 428/64 |
| 4,110,804 | 8/1978 | Castrodale et al. | 360/121 |
| 4,170,032 | 10/1979 | Yokoyama et al. | 360/120 |
| 4,279,633 | 7/1981 | Nakamura | 65/41 |
| 4,366,518 | 12/1982 | Chow | 360/121 |
| 4,392,167 | 7/1983 | Joormann | 360/120 |
| 4,396,967 | 8/1983 | Argumedo | 360/121 |
| 4,435,511 | 3/1984 | Weaver | 501/16 |
| 4,636,420 | 1/1987 | Wada | 29/603 |
| 4,638,387 | 1/1987 | Mukasa et al. | 360/122 |
| 4,794,483 | 12/1988 | Naitoh et al. | 360/120 |

FOREIGN PATENT DOCUMENTS 55-150118 11/1980 Japan.

OTHER PUBLICATIONS

Nelson; IBM Technical Disclosure Bull, vol. 21; No. 5, 10-1978, p. 1776, "Glass Bonding Magnetic Heads Below Melting Point of Glass".

IBM Technical Disclosure Bulletin, vol. 18, No. 6, Nov. 1975.

Primary Examiner—Richard V. Fisher
Assistant Examiner—John J. Bruckner
Attorney, Agent, or Firm—James A. Pershon

[57] ABSTRACT

A low magnetic isolation closure glass for use in multitrack magnetic tape heads has been prepared by combining a specific lead borosilicate glass with a specific borosilicate glass in a 60/40 weight percent ratio. The glass formed from the combination exhibits compatibility with ferrite and has reduced wear. Controlling the anneal temperature regulates the residual stress of the closure glass produced, and thus, provides some control over the wear characteristics of the glass.

10 Claims, 4 Drawing Sheets

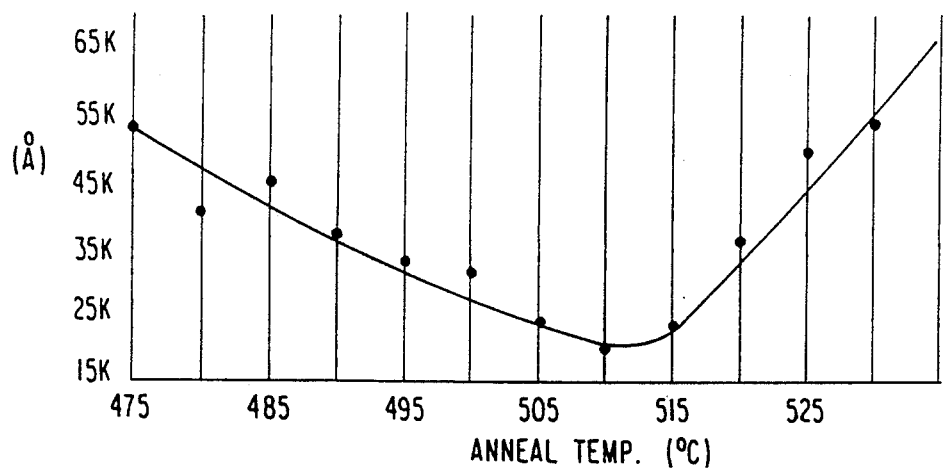
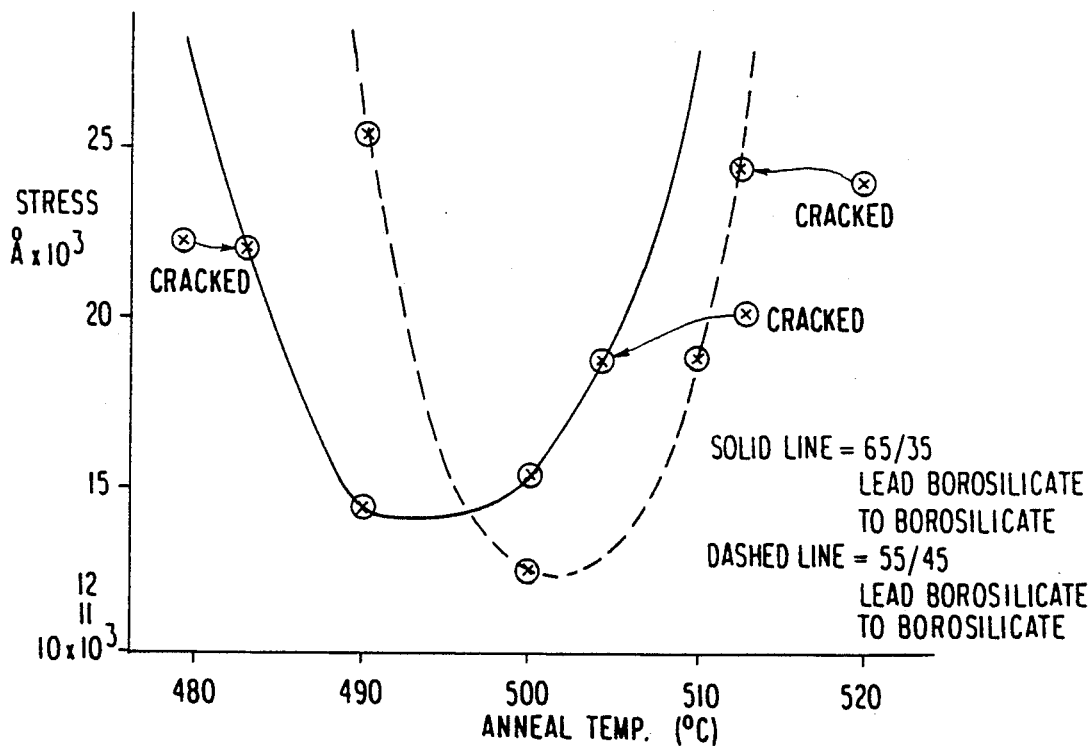

METHOD OF MAKING LOW WEAR GLASS FOR MAGNETIC HEADS

This application is a continuation of application Ser. No. 367,733 filed June 19, 1989, now abandoned.

BACKGROUND OF THE INVENTION

1. Field of the Invention

The subject invention generally relates to the isolation glass used in multitrack magnetic heads and, more particularly, to a new glass formulation with improved wear properties for use as the isolation glass.

2. Description of the Prior Art

Lead oxide based glasses are commonly used for the isolation glass in multitrack tape heads because of their compatibility with Nickel-Zinc (NiZn) ferrite. A typical example of a lead oxide based glass in common use for multitrack tape heads is IBM 400 glass. Table 1 details the composition IBM 400 glass.

TABLE 1

| CONSTITUENT | WEIGHT PERCENT |
| --- | --- |
| Lead Oxide (PbO) | 68.0 ± 0.5% |
| Silicon Oxide ($SiO_2$) | 20.8 ± 0.5% |
| Boron Oxide ($B_2O_3$) | 7.0 ± 1.5% |
| Aluminum Oxide ($Al_2O_3$) | 4.2 ± 1.5% |
| Remainder | 0.5% Maximum |

IBM 400 glass has an annealing point (glass viscosity = $10^{13}$ poise) of 435° C., a softening point (glass viscosity = $10^{7.6}$ poise) of 530° C., a working point (glass viscosity = $10^4$ poise) of 695° C. and a coefficient of thermal expansion equal to $70*10^{-7} \pm 3.0*10^{-7}$/° C. IBM 400 glass has superior properties in terms of its compatibility with NiZn ferrite; however, the glass has a high wear rate compared to that of the ferrite in the magnetic tape head.

Borosilicate based glasses have higher hardness and better wear attributes compared to lead oxide glasses. Borosilicate glass, specifically Corning ® glass code 7740, has an annealing point of 565° C., a softening point of 821° C., a working point of 1252° C., and a coefficient of thermal expansion equal to $32.5*10^{-7}$/° C. Lead borosilicate glass, specifically Corning ® glass code 7570 has an annealing point of 363° C., a softening point of 440° C., a working point of 560° C., and a coefficient of thermal expansion equal to $84*10^{-7}$/° C. However, neither borosilicate glass having Corning ® glass code 7740 nor lead borosilicate glass having Corning ® glass code 7570 alone are acceptable for bonding with NiZn ferrite.

U.S. Pat. No. 4,638,387 to Mukasa et al. discloses the use of borosilicate glass as an impregnating material for filling fine voids in a sliding contact member used in conjunction with a magnetic tape head. U.S. Pat. No. 4,069,360 to Yanagisawa et al. discloses the use of a polysilicate layer, which may be borosilicate glass, coated with a lubricant to protect and reduce frictional wearing of the recording disc on which it is coated and the surface of the magnetic recording head. U.S. Pat. No. 4,170,032 to Yokoyama et al. discloses a magnetic head wherein borosilicate glass is sputter deposited in the gap area. U.S. Pat. No. 4,110,804 to Castrodale et al. discloses the use of lead borosilicate glass for bonding parts of the transducer in a read/write and tunnel erase magnetic head assembly. None of the above-patents show or discuss the use of borosilicate based glass as a closure glass in a multitrack tape head.

Prior art multitrack heads suffer from excessive wear of the closure glass. When the closure glass wears down at a faster rate than the ferrite, the tape head becomes unreliable. The superior wear characteristics of borosilicate based glasses have not been applied in multitrack heads because of their incompatibility with NiZn ferrite.

SUMMARY OF THE INVENTION

It is therefore an object of this invention to provide a magnetic head with improved wear characteristics which utilizes a borosilicate based glass composition.

It is another object of this invention to provide a glass composition compatible with NiZn ferrite which is a combination of borosilicate glass and lead borosilicate glass.

It is yet another object of this invention to provide a magnetic isolation glass in which the wear characteristics can be regulated by adjusting the anneal cycle.

According to the invention, lead borosilicate glass having Corning ® glass code 7570 has been combined with borosilicate glass having Corning ® glass code 7740 to form a new glass which has improved attributes for use as a magnetic isolation glass. Experiments were performed from which it was determined that an optimum weight percentage ratio of lead borosilicate glass to borosilicate glass was a 60/40 ratio. The 60/40 ratio of lead borosilicate glass to borosilicate glass produced the best results in terms of melting temperature, ferrite compatibility, stress and wear.

A powdered mixture of 60% by weight lead borosilicate glass and 40% by weight borosilicate glass was put on the surface of a slotted magnetic ferrite slab (a ferrite slab with slots cut therein). The slab was then placed in an oven and the glass was melted in a procedure called "glassing". Glass bubbles were then removed using a "hipping" procedure. Finally, the glass was annealed. Experiments were performed in which it was determined that 510° C. was the optimum anneal temperature. It was determined that the residual stress in the glass, which is a function of the anneal cycle, can affect the wear characteristics of the glass produced. Wear bar samples were prepared from the slabs and were tested using a media abrasivity test procedure.

BRIEF DESCRIPTION OF THE DRAWINGS

The foregoing and other objects, aspects and advantages of the invention will be better understood from the following detailed description of the preferred embodiments of the invention with reference to the accompanying drawings, in which:

FIG. 6 and 7 are a graphical representation of bow stress test results versus the anneal temperature utilized for a glass sample.

DETAILED DESCRIPTION OF THE PREFERRED EMBODIMENTS OF THE INVENTION

Figure 1:
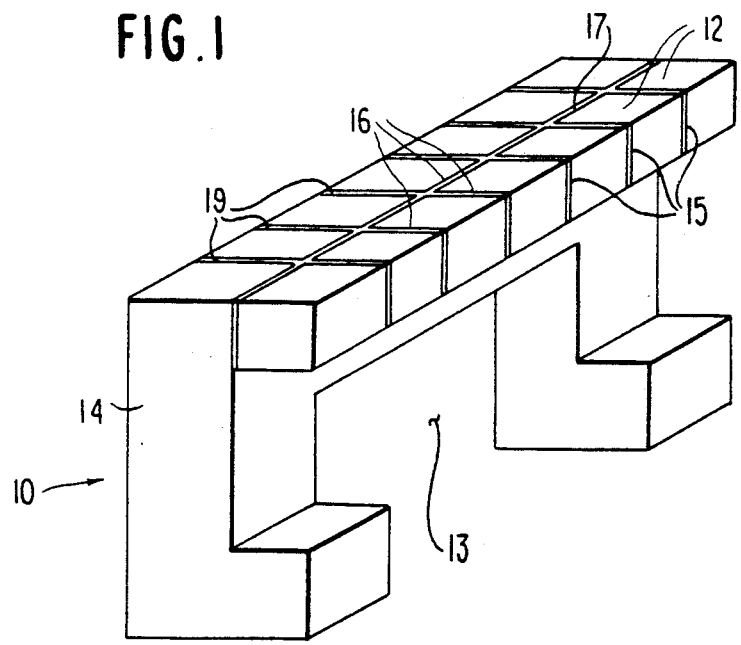
FIG. 1 is an isometric view of a section in a multitrack head.

Referring now to the drawings and, more particularly to FIG. 1, there is shown a closure section 10 for a multitrack tape head. A row of magnetic ferrite blocks 12 are supported by a substrate 14. The ferrite blocks 12 are magnetically isolated from each other by slots 15 filled with an isolation glass 16. The ferrite blocks 12 are also magnetically isolated from the substrate 14 by a slot 17 also filled with the isolation glass 16. Slots 19 are formed in the substrate 14 more as a result of the slot cutting process that resulted in the slots 15 which are the necessary slots. The slots 19 are also filled with the isolation glass 16 in order to provide a uniform, essentially flat surface. Again because the magnetic ferrite blocks 12 are processed from the substrate 14, the blocks 12 must be magnetically isolated from the substrate 14 for operation. Reference is made to the IBM Technical Disclosure Bulletin Vol. 18, No. 6, pp. 1981, published in November, 1975 by Franklin, et al. for the process that results in the structure of FIG. 1. The width of the ferrite blocks 12 determine the width of the data tracks and the width of the isolation glass 16 between the ferrite blocks 12 establishes the separation distance between the data tracks.

Figure 2:
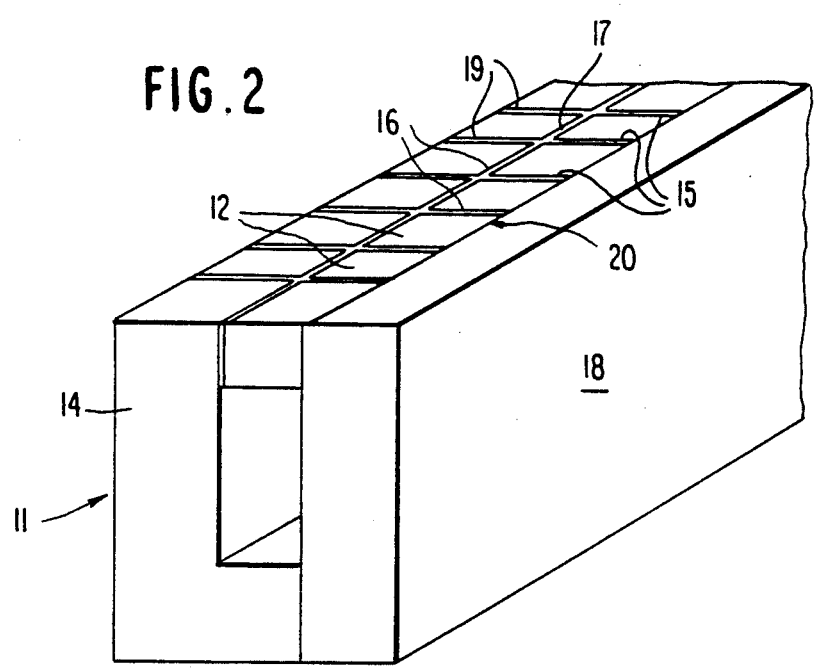
FIG. 2 is an isometric view of a multitrack tape head.

FIG. 2 shows a multitrack tape head 11 where a magnetic ferrite wafer 18 having the same length and width as the section 10 is spaced from the section 10 by a transducing gap 20. The transducing gap 20 co-acts with a magnetic medium such as a tape or disc to cause magnetic transitions to be written on the medium. Each ferrite block 12, together with the ferrite wafer 18 provide the two pole pieces and each form a separate part of the transducing gap 20 to read and/or write magnetic transitions from and/or to a separate track on the magnetic medium. A coil (not shown) is inserted between each ferrite block 12 and the ferrite wafer 18 in the transducing gap 20 and provides the transducing actions for the multitracks of the head 11. Fabrication and operation of the multitrack head 11 is not specifically important to this invention and may be done according to well known techniques of which U.S. Pat. No. 4,366,518 to Chow et al., U.S. Pat. No. 4,396,967 to Argumendo et al., and IBM TDB Vol. 18, No. 6, pp. 1981, 1975 by Franklin et al. are but a few examples. This invention is primarily concerned with the wear characteristics of the isolation glass 16 used in the multitrack tape head 11.

Lead borosilicate glass, hereinafter called low temperature or LT lead borosilicate glass, is available from the Corning glass company of New York,, and is sold under Corning ® glass code 7570. The LT lead borosilicate glass is finely powdered and may be applied by dipping, extruding, silk screening, or by other suitable techniques. A slurry of the glass can be prepared by adding a suitable vehicle to the glass such as amyl acetate, and 1.2% by weight nitrocellulose. LT lead borosilicate glass has a working point equal to 560° C., where the working point is defined by a glass viscosity equal to $10^4$ poise. The coefficient of thermal expansion for LT lead borosilicate glass is equal to $84*10^{-7}$ in/in/° C.

Borosilicate glass, hereinafter called high temperature or HT borosilicate glass, is available from the Corning glass company of New York and is sold under Corning ® glass code 7740 which, is a low expansion borosilicate glass). Like LT lead borosilicate glass, the HT borosilicate glass is available in powder form and can be applied by the techniques discussed above. HT borosilicate glass has a working point equal to 1252° C. and a coefficient of thermal expansion equal to $33*10^{-7}$ in/in/° C. Both, LT lead borosilicate glass and HT borosilicate glass have high corrosion resistance.

The inventors have determined experimentally that a combination of LT lead borosilicate glass and HT borosilicate glass will produce a new glass which is suitable for use in multitrack magnetic heads. A 70/30 weight percent mixture of LT lead borosilicate glass to HT borosilicate glass is compatible with NiZn ferrite and has a melting temperature equal to 870α C. The 70/30 glass has good properties generally but is subject to excessive wear. A 50/50 weight percent mixture of LT lead borosilicate glass to HT borosilicate glass has a melting temperature equal to 980° C., too high for NiZn ferrite compatibility. In addition, the 50/50 glass had a tendency to crack because of its highly stressed state when incorporated within the magnetic isolation slots of the pole section 10 (i.e., isolation glass 16 in FIG. 1). A 60/40 weight percent mixture of LT lead borosilicate glass to HT borosilicate glass had the optimum characteristics for use as the isolation glass 16 in a multitrack head. The 60/40 glass had a melting temperature of 920° C. and a coefficient of thermal expansion which was suitable for use with NiZn ferrite. Acceptable composition limits are a 55/45 weight percent mixture of LT lead borosilicate glass to HT borosilicate glass to a 65/35 weight percent mixture of LT lead borosilicate glass to HT borosilicate glass. If the LT lead borosilicate component exceeds 65%, stress is too great and wear is too high. If the HT borosilicate component exceeds 45%, stress again is too great and the glassing temperature required for processing causes unacceptable ferrite grain boundary attack.

Figure 3:
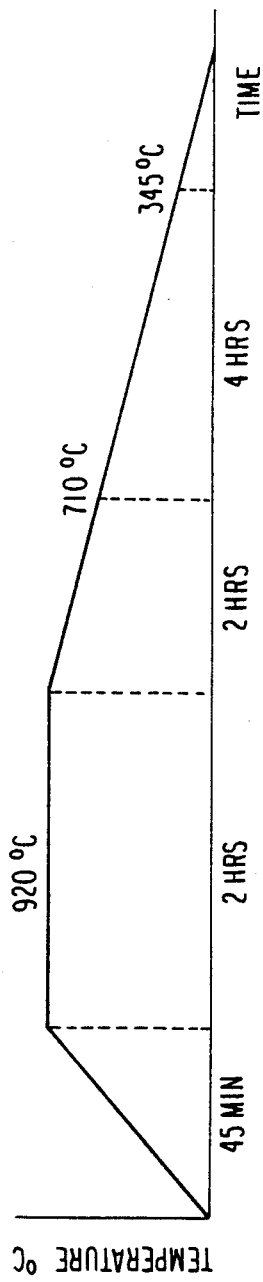
FIGS. 3-5 are time versus temperature profiles of the oven temperature used for the steps of glassing, hipping, and annealing, respectively.
Figure 4:
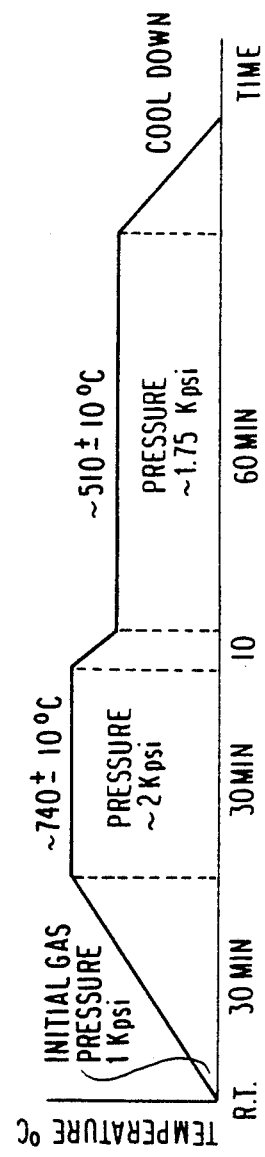
Figure 5:
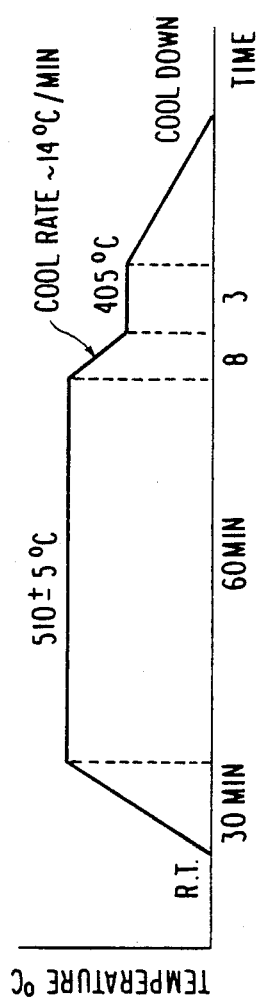

FIGS. 3 through 5 show the time, temperature, and pressure conditions used for glassing, hipping, annealing the 60/40 glass combination. FIG. 3 shows the temperature profile for the step of glassing. The LT lead borosilicate glass and the HT borosilicate glass were combined in powder form in a 60/40 weight percent mixture. After being thoroughly mixed, approximately three to four grams of the powder combination was placed on the surface of a slab of NiZn ferrite which had the multiple slots, slots 15, 17 and 19 of FIG. 1, for instance, cut in the top surface. The slab with the glass powder was placed into an infra-red heating furnace. The glass was melted on the slab, thereby filling in the slots to form the isolation glass 16, for instance, by heating the slab to 920° C. during a forty five minute ramp interval, then holding the temperature at 920° C. for two hours, then decreasing the temperature to 710° C. during a two hour interval, then decreasing the temperature to 345° C. during a four hour interval, and finally returning the oven to room temperature.

FIG. 4 shows the process of "hipping" was performed under both controlled temperature and pressure conditions. Hipping, that is, a hot isostatic pressing procedure, is a procedure designed to remove any glass hubbles present in the glass. Upon removal from the infra-red furnace used in glassing, the glassed, ferrite slabs were placed in an isostatic furnace. During a thirty minute interval the furnace temperature was increased from room temperature to 740° C. The gas pressure for the furnace during the thirty minute ramp was initially 1000 pounds per square inch (psi). The pressure increases as a function of temperature and was approximately 2000 psi at 740° C. This temperature and pressure were maintained for thirty minutes at which time the temperature was reduced to 510° C. and the pressure reduced to 1750 psi over a ten minute interval, and the temperature and pressure were held constant for an hour before the isostatic furnace was cooled down.

FIG. 5 shows the anneal heating cycle which is performed in the infra-red furnace. Annealing is a heating and slow cooling process used to toughen the glass and reduce brittleness. The glassed and hipped ferrite slabs are placed in the infra-red furnace and the temperature of the furnace is ramped to 510° C. from room temperature over a thirty minute interval, then the furnace temperature is held constant for one hour, then the furnace is cooled to 405° C. at a cooling rate equal to 14° C.±2° C./minute over an eight minute time interval and the furnace is held constant at 405° C. for three minutes before it is finally cooled down.

FIG. 6 shows experimental bow stress results for the 60/40 glass combination where various anneal temperatures were used. All samples used in the experiment were crack free. The bow stress test is performed by taking the glassed, hipped, and annealed substrate and removing the excess glass from the top of the slots by grinding. In addition, a large slot 13, see FIG. 1, is ground into the back side of the substrate for the purpose of mounting the head in the drive. If a profile trace is now taken from edge to edge of the substrate across the glass slots, a measure of stress is obtained. The magnitude of the bow is proportional to the resultant stress of the ferrite/glass laminated structure. Bow measurements were taken on ferrite samples of 11 and 22 mm in length. Data shown in FIG. 6 has been normalized to the 11 mm sample. From FIG. 6 it can be determined that annealing the 60/40 LT lead borosilicate to HT borosilicate glass at 510° C. yields a glass with the minimum residual stress. The 510° C. optimum anneal temperature was implemented in the anneal cycle shown in FIG. 5.

FIG. 7 shows experimental bow stress results for 65/35 and 55/45 glass combinations where various anneal temperatures were used. The bow stress test was performed as discussed above. Bow measurements were taken on ferrite samples 11 mm in length. FIG. 7 indicates some cracking occurs with these combinations under higher stress conditions. These combinations of LT lead borosilicate and HT borosilicate glass should be considered the outer limits for an acceptable isolation glass for use with NiZn magnetic ferrite.

Wear bar samples were prepared from the glassed, hipped, and annealed ferrite slabs which resulted from the procedures shown in FIGS. 3 through 5. Wear bar samples are sections of the slab which are cut and milled to have a surface which has alternating ferrite and glass portions. A sample under test was then worn with a tape recording media by passing the tape over the corner of the test sample. This test produces a flat where the tape wears the corner away. A profile trace taken along the worn flat will show the relative height of both the ferrite and glass. From this information, the relative wear rates of both ferrite and glass can be determined.

Figure 8:
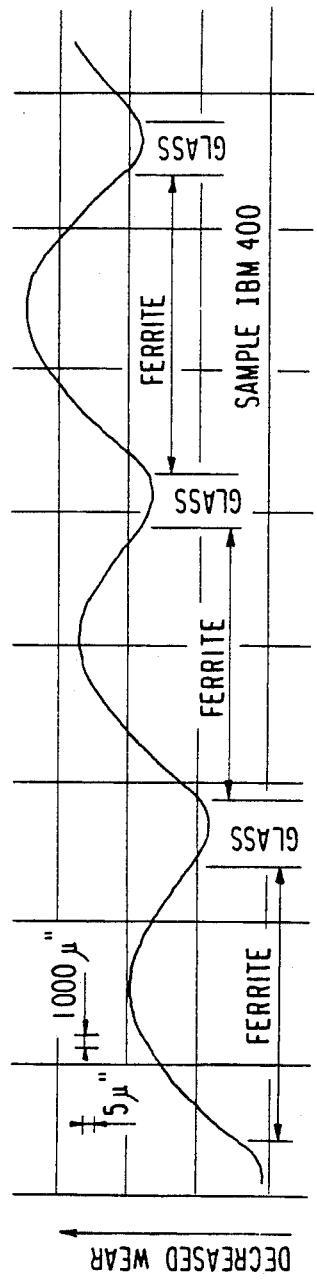
FIGS. 8-10 are plots of the media abrasivity test results for wear bars which use IBM 400 glass, high stress lead borosilicate glass/borosilicate glass, and low stress lead borosilicate glass/borosilicate glass, respectively.
Figure 9:
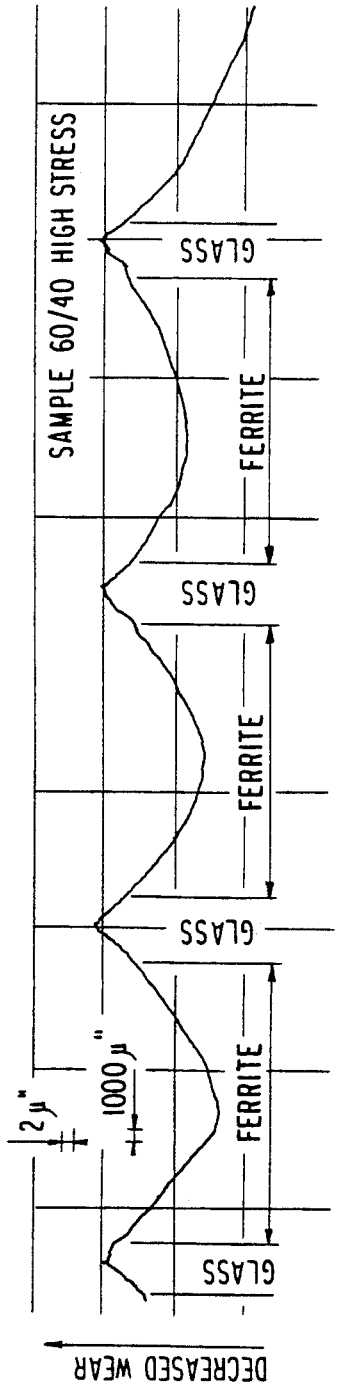
Figure 10:
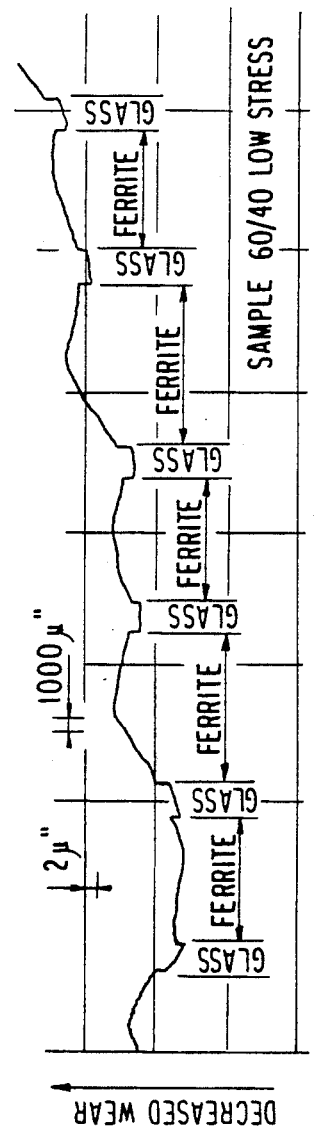

FIGS. 8 through 10 show wear bar profile results obtained using the abrasivity test discussed above for wear bars having IBM 400 glass, wear bars having high stress 60/40 LT lead borosilicate to HT borosilicate glass (i.e., glass annealed, at 480° C.), and wear bars having low stress 60/40 LT lead borosilicate to HT borosilicate glass (i.e., glass annealed at 510° C.), respectively. The results for the IBM 400 glass wear bar shown in FIG. 8 is used as a reference and its scale is 5μ" along the ordinate by 1000μ" along the abscissa. The scale in both FIGS. 9 and 10 are 2μ" by 1000μ". In comparison to the IBM 400 glass, the 60/40 LT lead borosilicate to HT borosilicate glass wore much less.

Contrasting FIGS. 9 and 10, it can be seen that the wear characteristics of the 60/40 glass are related to the residual stress in the glass. FIG. 9 shows that the higher the stress in the 60/40 glass the less the wear rate, while FIG. 10 shows that at low stress, the 60/40 glass wear is approximately the same as NiZn ferrite which is the desired property for the isolation glass in a multitrack head.

While the invention has been described in terms of its preferred embodiment where specific time-temperature-pressure glassing, hipping, and annealing conditions are utilized, those skilled in the art will recognize that variations in these conditions can be practiced within the scope of the appended claims.

Having thus described our invention, what we are desirous of securing by Letters Patent is the following:

1. A multitrack head including blocks of a magnetic ferrite and having a magnetic isolation glass filling slots separating said blocks for magnetic isolation between said blocks, said glass produced by the process comprising:

mixing LT lead borosilicate glass at a weight percent ranging from 65 to 55 percent with the remainder being HT borosilicate glass, said mixing step producing a glass mixture;

applying said glass mixture to the slots separating said blocks;

glassing the slots with said glass mixture by heating said blocks and said glass mixture to a temperature sufficient to melt said glass mixture, said melted glass mixture filling the slots;

hot isostatic pressing said glassed slots by subjecting said glassed slots and said blocks to sufficient temperature and pressure conditions to remove any bubbles present in said glass; and annealing said blocks with the glassed slots at a selected temperature which toughens the glass present in said slots.

2. A multitrack head as recited in claim 1 wherein said LT lead borosilicate glass used in said mixing step is present at approximately sixty percent by weight and said HT borosilicate glass used in said mixing step is present at approximately forty percent by weight.

3. A multitrack head as recited in claim 1 wherein said selected temperature in said annealing step is chosen according to a desired stress level for said glass present in said slabs.

4. A multitrack head as recited in claim 1 wherein said selected temperature in said annealing step is between 500° C. and 520° C.

5. A magnetic head including glass filling slots separating blocks of a magnetic ferrite for magnetic isolation between said blocks, wherein said glass comprises a mixture of LT lead borosilicate glass in the approximate range of 55 to 65 weight percent with the remainder being HT borosilicate glass.

6. A magnetic head as defined in claim 5 wherein a said glass comprises a mixture of LT lead borosilicate glass of approximately sixty percent by weight and of HT borosilicate glass of approximately forty percent by weight.

7. In a magnetic head having pole pieces and means for activating said pole pieces to write and/or read magnetic transitions to and/or from a magnetic media, at least one of said pole pieces including magnetic isolation glass between portions of said pole pieces, the improvement wherein said magnetic isolation glass comprises a mixture of an LT lead borosilicate glass and an HT borosilicate glass, said LT lead borosilicate being present in the range of from 55 to 65 weight percent with the remainder being HT borosilicate glass.

8. In a magnetic head as defined in claim 7 wherein said glass comprises a mixture of LT lead borosilicate glass of approximately sixty percent by weight and of HT borosilicate glass of approximately forty percent by weight.

9. A magnetic head for reading and/or writing magnetic transitions from and/or to a magnetic media comprising:
- pole pieces, at least one of said pole pieces requiring magnetic isolation;
- means including a coil for activating said pole pieces to provide a transducing action for reading and/or writing the magnetic transitions;
- at least one slot formed in said at least one of said pole pieces, said slot providing the magnetic isolation;
- a magnetic isolation glass filling said slot, said glass comprising a mixture of LT lead borosilicate glass in the approximate range of 55 to 65 weight percent with the remainder being HT borosilicate glass.

10. A magnetic head as defined in claim 9 wherein said glass comprises a mixture of LT lead borosilicate glass of approximately sixty percent by weight and of HT borosilicate glass of approximately forty percent by weight.

* * * * *